United States Patent
Kennedy et al.

(10) Patent No.: US 7,521,010 B2
(45) Date of Patent: Apr. 21, 2009

(54) FLUOROPOLYMER BARRIER MATERIAL

(75) Inventors: Michael E. Kennedy, Landenberg, PA (US); Donald L. Hollenbaugh, Jr., North East, MD (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/935,769

(22) Filed: Nov. 6, 2007

(65) Prior Publication Data

US 2008/0061472 A1    Mar. 13, 2008

Related U.S. Application Data

(62) Division of application No. 10/831,420, filed on Apr. 23, 2004, now abandoned.

(51) Int. Cl.
*B29C 55/12* (2006.01)
(52) U.S. Cl. .................. 264/113; 264/120; 264/127; 264/289.3; 264/290.2
(58) Field of Classification Search ............... None
See application file for complete search history.

(56) References Cited

U.S. PATENT DOCUMENTS

| 3,953,566 | A | 4/1976 | Gore | 264/288 |
|---|---|---|---|---|
| 4,732,629 | A | 3/1988 | Cooper et al. | 156/53 |
| 5,061,276 | A * | 10/1991 | Tu et al. | 623/1.33 |
| 5,061,561 | A | 10/1991 | Katayama | 428/364 |
| 5,374,473 | A | 12/1994 | Knox et al. | 428/218 |
| 5,792,525 | A | 8/1998 | Fuhr et al. | 428/35.7 |
| 6,080,472 | A * | 6/2000 | Huang et al. | 428/315.5 |
| 6,183,929 | B1 | 2/2001 | Chow et al. | 430/124 |
| 6,336,026 | B1 | 1/2002 | Heeks et al. | 399/302 |
| 6,465,103 | B2 | 10/2002 | Tsai et al. | 428/422 |
| 7,226,558 | B2 * | 6/2007 | Nieman et al. | 264/291 |
| 2003/0062644 | A1 | 4/2003 | Oyama et al. | 264/41 |
| 2006/0233990 | A1 * | 10/2006 | Humphrey et al. | 428/36.9 |

FOREIGN PATENT DOCUMENTS

WO    WO 02/102572    12/2002

* cited by examiner

*Primary Examiner*—Mary Lynn F Theisen
(74) *Attorney, Agent, or Firm*—Carol A. Lewis White

(57) ABSTRACT

A novel densified fluoropolymer article is described which has a water vapor permeation of about 0.015 g-mm/m²/day or less, and preferably has a matrix tensile strength of at least 10,000 psi in two orthogonal directions. The articles are made by compressing expanded porous PTFE at pressures, temperatures and times which result in elimination of the pores, and subsequent stretching above the crystalline melt temperature.

4 Claims, 3 Drawing Sheets

US 7,521,010 B2

FLUOROPOLYMER BARRIER MATERIAL

RELATED APPLICATIONS

The present application is a divisional application of U.S. patent application Ser. No. 10/831,420, filed Apr. 23, 2004 now abandoned.

FIELD OF THE INVENTION

The present invention relates to a fluoropolymer barrier material, preferably comprising a dense polytetrafluoroethylene sheet or film, which exhibits very low water vapor permeation and improved tensile properties in both the length and width dimensions (i.e., directions), and to processes for manufacture of said barrier which include a combination of densification, sintering, and stretching of polytetrafluoroethylene.

BACKGROUND OF THE INVENTION

The challenge of locating a thermally stable polymer film with excellent barrier properties as well as good mechanical properties for use in a broad range of applications has led researchers in varied directions. Both monolithic and multi-component, multi-layer films have been constructed; however, to date, no suitable materials have been available which provide the unique combination of thermal stability, strength, thinness and, most importantly, barrier properties as demonstrated by resistance to water vapor permeation.

One attempt to solve this problem is taught in U.S. Pat. No. 6,465,103 B1, to Tsai et al., which is directed to highly oriented multilayer films produced by coextruding or laminating at least one layer of PCTFE (polychlorotrifluoroethylene) fluoropolymer, at least one layer of a polyolefin homopolymer or copolymer and an intermediate adhesive layer of a polyolefin having at least one functional moiety of an unsaturated carboxylic acid or anhydride thereof. The polyolefin layer allows the fluoropolymer layer to be stretched up to ten times its length to orient the fluoropolymer film and increase mechanical properties and water vapor properties of the film. Commercially available films of this construction are sold under the trade name ACLAR® by Honeywell Corporation. However, limitations exist with respect to these materials, including the presence of the polyolefin and adhesive layers which contribute undesirable thickness to the final film and added cost during processing. Moreover, these films have limited chemical and temperature resistance (e.g., maximum thermal stability reported for ACLAR® films is about 215° C.) and limited water vapor permeation resistance.

Other materials have also been evaluated for suitability in demanding barrier applications. For example, a polyvinylidene chloride (PVDC) copolymer film sold by the Dow Chemical Company (Midland, Mich.) under the trade name SARAN is widely known as a barrier film for protecting foods against oxygen, moisture and chemical attack, as well as other barrier applications. However, this PVDC film has limited chemical and temperature range (i.e., melt temperature of about 160° C.) and limited water vapor permeation resistance.

The advantage of using polytetrafluoroethylene (PTFE) in harsh chemical environments and over a broad range of temperatures is well known. PTFE has exhibited utility as a material for use in harsh chemical environments where other polymers quickly degrade. PTFE also has a useful temperature range from as high as 260° C. to as low as near −273° C. However, PTFE is characterized by poor mechanical properties such as low tensile strength, poor cold flow resistance or creep resistance, poor cut-through and abrasion resistance and a general poor mechanical integrity that precludes its consideration in many materials engineering applications.

Low porosity PTFE articles have been made in the past through use of a skiving process in which solid PTFE films are split or shaved from a thicker preformed article. These articles are characterized by low strength, poor cold flow resistance, and poor load bearing capabilities in both the length and width directions of the film. Processes including paste extrusion of PTFE fine powder have also been used to produce low porosity PTFE articles, however they are also characterized by relatively poor mechanical characteristics. Attempts have also been made to strengthen low porosity PTFE films by stretching in the length dimension. Strength gains are minimal and, by the nature of the process, are achieved in only a single dimension, thus greatly minimizing the utility of the film.

A PTFE material, specifically, expanded polytetrafluoroethylene, may be produced as taught in U.S. Pat. No. 3,953,566. This porous expanded polytetrafluoroethylene (ePTFE) has a microstructure consisting of nodes interconnected by fibrils. It is of higher strength than unexpanded PTFE and retains the chemical inertness and wide useful temperature range of unexpanded PTFE.

However, ePTFE is porous and hence cannot be used as a barrier layer to low surface tension fluids since such fluids with surface tensions less than 50 dyne-cm pass through the pores of the membrane. Compressed ePTFE articles are taught in U.S. Pat. No. 3,953,566 in which a platen press was used to densify a thin sheet of ePTFE with and without heat. However, cold flow occurred in the press, non-uniform parts resulted and a density of over 2.1 g/cc was not achieved. The ePTFE sheet used in U.S. Pat. No. 3,953,566 was stretched or strengthened in only one direction and, hence, the utility of the finished article was severely limited.

Similarly, U.S. Pat. No. 4,732,629, to Cooper et al., describes a method of increasing the cut-through resistance of a PTFE insulated conductor. Unsintered PTFE was expanded and compressed and then applied to a conductor. However, densities of 2.1 g/cc or greater were not achieved, and the resultant tensile strengths of the finished article were not reported for either the length or width directions.

U.S. Pat. No. 5,061,561 to Katayama describes a method to produce high density fibers from ePTFE; however, the method yielded an article that is significantly different from this invention and applicable only to fine filaments and not to sheets.

In U.S. Pat. No. 5,374,473 to Knox et al., a method is described for producing articles of densified ePTFE by placing two or more layers of porous ePTFE inside a heat and pressure stable flexible container, evacuating gas from the chamber, subjecting the chamber to a pressure of 150 to 350 psi and temperature from 368-400° C., then cooling the container while reducing pressure. The resulting densified structure is described as useful in such barrier applications as pump diaphragms when laminated to a flexible backer. While the Knox et al. materials exhibit improved barrier properties in the applications described, the methods and articles taught are limited to making thin, flexible PTFE films with uniformly good barrier properties (e.g., a water vapor permeation coefficient on the order of 0.10 g-mm/m$^2$/day).

U.S. Pat. No. 5,792,525, to Fuhr et al., teaches forming creep resistant articles which are dimensioned from a stock material of one or more layers of expanded polytetrafluoroethylene which have been densified. The densified expanded PTFE material exhibits remnants of a fibril and node structure, and the resultant article is resistant to creep at high temperatures and under high loads. The stock material is preferably formed in the manner taught in U.S. Pat. No. 5,374,473, to Knox et al., described earlier herein. The shaped articles are then formed by any suitable method such as a heat forming process or a machine forming process. Compression molding and lathing are specifically described as shaping methods. Fuhr et al. does not teach or suggest the capability of forming thin PTFE films with good barrier properties.

WO 02/102572 A1 is directed to PTFE resin blow molded articles and resin blow molding methods. The PTFE starting material is drawn by blow molding at a temperature at or above the temperature at which PTFE begins to melt, which is a temperature where both crystalline and non-crystalline regions are present in the PTFE, to form a non-porous structure. From the teachings, this method and product are subject to significant variations in processing and product properties, and trial and error is necessary to determine the drawing temperature and draw ratio for each batch of material. In addition, significant limitations in material size and material strength would result based on the processing techniques taught.

Two products currently available from W.L. Gore and Associates, Inc. include a dense fluoropolymer film exhibiting barrier properties. The first product comprises a PTFE barrier layer bonded between two porous PTFE layers. The second product comprises a PTFE barrier layer bonded on one side to a thermoplastic layer such as FEP (fluoroethylene propylene), PFA (perfluoroacrylate) or THV (a polymer of tetrafluoroethylene, hexafluoropropylene and vinylidene fluoride). The barrier layer in these commercial products is a film of high water vapor resistance (i.e., low water vapor permeation) PTFE having good tensile properties in the orthogonal directions of width and length. It would be understood by an artisan of skill in the art that barrier performance and bulk density of a material are positively correlated. This barrier layer has a bulk density of 2.11 g/cc or greater, is substantially free of pores, has a matrix tensile strength of 10,000 psi or greater in both the width and length directions, and has a water vapor permeation coefficient of 0.018 g-mm/$m^2$/day. While these materials have been successfully implemented in a number of applications requiring flexible, thin materials with good chemical resistance and water vapor permeation resistance, a need still exists for materials with further improved performance for even more demanding barrier applications.

SUMMARY OF THE INVENTION

One objective of the present invention is to provide improved fluoropolymer barrier materials exhibiting enhanced barrier properties, including excellent water vapor permeation resistance (reported as the water vapor permeation coefficient of the material) and strength, which have not heretofore been achieved in the prior art. It will be appreciated by those of skill in the art that the water vapor permeation resistance of a given material is a strong indication of permeation resistance to a wide variety of permeants, and the present invention is in no way limited thereby. Such improved barrier properties are valuable in many applications where resistance to a variety of permeants under aggressive conditions is desirable. The present invention provides improved fluoropolymer barrier materials, preferably comprising dense PTFE sheets or films, with water vapor permeation coefficients of about 0.015 g-mm/$m^2$/day or less, more preferably about 0.010 g-mm/$m^2$/day or less, and even more preferably as low as about 0.003 g-mm/$m^2$/day or less. As noted earlier herein, important benefits to fluoropolymers comprising PTFE materials include a resistance to harsh chemical environments where other polymers quickly degrade and a useful temperature range from as high as 260° C. to as low as near −273° C.

Another objective of this invention is to enhance the utility of such fluoropolymer barrier materials, preferably comprising dense PTFE sheets or films, by providing improved tensile strengths in orthogonal (i.e., the length and width, etc.) directions. This improvement is of utility in applications requiring improved flex life, load bearing, impact and rupture resistance, notch propagation resistance, cut-through resistance, and abrasion resistance. Improved tensile strengths in both the length and width directions can be achieved in dense PTFE sheets without the need for reinforcing materials that compromise the chemical performance of the finished article. This invention provides for a fluoropolymer barrier material with not only lower water vapor permeation, but also greater tensile strengths in orthogonal directions and greater toughness, along with the excellent chemical and thermal characteristics of traditional dense PTFE sheets or films. Sheets and films of the invention can be made in unusually thin form.

Thus, this invention now provides fluoropolymer barrier materials which have the unique combination of thermal stability, strength, thinness and, most importantly, excellent barrier properties. Desirable thicknesses of the barrier materials of the present invention are on the order of 3 mm or less, more preferably 0.5 mm or less, and even more preferably as low as 18 μm and down to about 2 μm or less. Preferred tensile strengths of the materials of the present invention are on the order of at least 10,000 psi in both the width and length directions (i.e., in two orthogonal directions), more preferably at least 15,000 psi in at least one direction, and most preferably at least 25,000 psi in at least one direction. Throughout this document the terms width and length are respectively analogous to the x and y directions. Barrier properties of the novel fluoropolymer materials of the present invention as demonstrated by resistance to water vapor permeation are about 0.015 g-mm/$m^2$/day or less, more preferably about 0.010 g-mm/$m^2$/day or less, and even more preferably as low as about 0.003 g-mm/$m^2$/day or less.

This invention is directed to both products and processes. The processes are processes for making sheets or films of high density PTFE, high density filled PTFE, and composites of high density PTFE and other materials, as desired, with low water vapor permeation and with high tensile strength in both the length and width directions.

These processes comprise compressing the sheet or sheets of porous ePTFE, either on an appropriate batch press, such as a platen press, or alternatively, in a continuous manner by compressing between rollers or other suitable compression equipment at a linear speed and at a pressure sufficient to substantially eliminate the pores, and at a temperature above usual room temperature (about 20° C.). The resultant dense material is subsequently stretched above the crystalline melt temperature of PTFE.

In one preferred aspect, the product is a sheet comprising high density PTFE having improved permeation properties and improved tensile properties. Specifically, the product has a water vapor permeation coefficient of about 0.015 g-mm/$m^2$/day or less, more preferably about 0.010 g-mm/$m^2$/day or less, and even more preferably as low as about 0.003 g-mm/$m^2$/day or less, and has a matrix tensile strength of at least 15,000 psi in at least one direction.

In another aspect of the invention, the product may comprise a sheet of high density PTFE incorporating at least one filler and having the improved barrier properties and other properties described.

In another preferred embodiment, the product is a sheet comprising a low permeation PTFE film laminated to another substrate. Lamination can be achieved by adhering or co-joining other films, e.g., by thermally, chemically or mechanically bonding the materials. Specifically, this other substrate may include one or more fluoropolymer sheets or films such as FEP, PFA, PTFE, THV and other suitable fluoropolymers. Similarly, other polymer substrate materials may include, but are not limited to, polyurethanes, polyethylenes, polyamides, ethylene vinyl alcohol (EVOH), polyvinylidene chloride (PVDC), and the like. Further, the substrate may be metallic, glass, an inorganic sheet, pressure sensitive adhesive(s), etc. Various laminated structures may be made which facilitate or enhance further bonding to additional layers (e.g., textiles, or the like). The barrier component of this product has a water vapor permeation coefficient of about 0.015 g-mm/m$^2$/day or less, more preferably about 0.010 g-mm/m$^2$/day or less, and even more preferably as low as about 0.003 g-mm/m$^2$/day or less. Even more preferred structures incorporate a material with these superior barrier properties along with a tensile strength of 10,000 psi or greater in both the x and y directions.

The process is a process for making sheets of high density PTFE, filled PTFE, or PTFE laminates with improved water vapor permeation and improved tensile strength in both the x and y directions. One such process comprises:

(a) densifying at least one sheet of expanded porous PTFE or a bundle of layered sheets, in either sintered or unsintered form, according to the teachings of Knox et al., U.S. Pat. No. 5,374,473, (b) preheating the densified PTFE above the crystalline melt temperature of PTFE, and (c) stretching the heated PTFE membrane in the width direction, the length direction, or both the width and length direction, either sequentially in either order or simultaneously, at a rate of at least 1 percent per second, more preferably at least 3 percent per second, more preferably at 5 percent per second or greater, and at a stretch ratio of greater than 4:1. It should be appreciated that interactions of the mechanical properties of the precursor and the stretch rate and/or stretch ratio for stretching performed above the crystalline melt temperature can impact the barrier performance of the resulting material, as demonstrated in more detail in the Detailed Description and Examples herein.

DETAILED DESCRIPTION OF THE INVENTION

Figure 1:
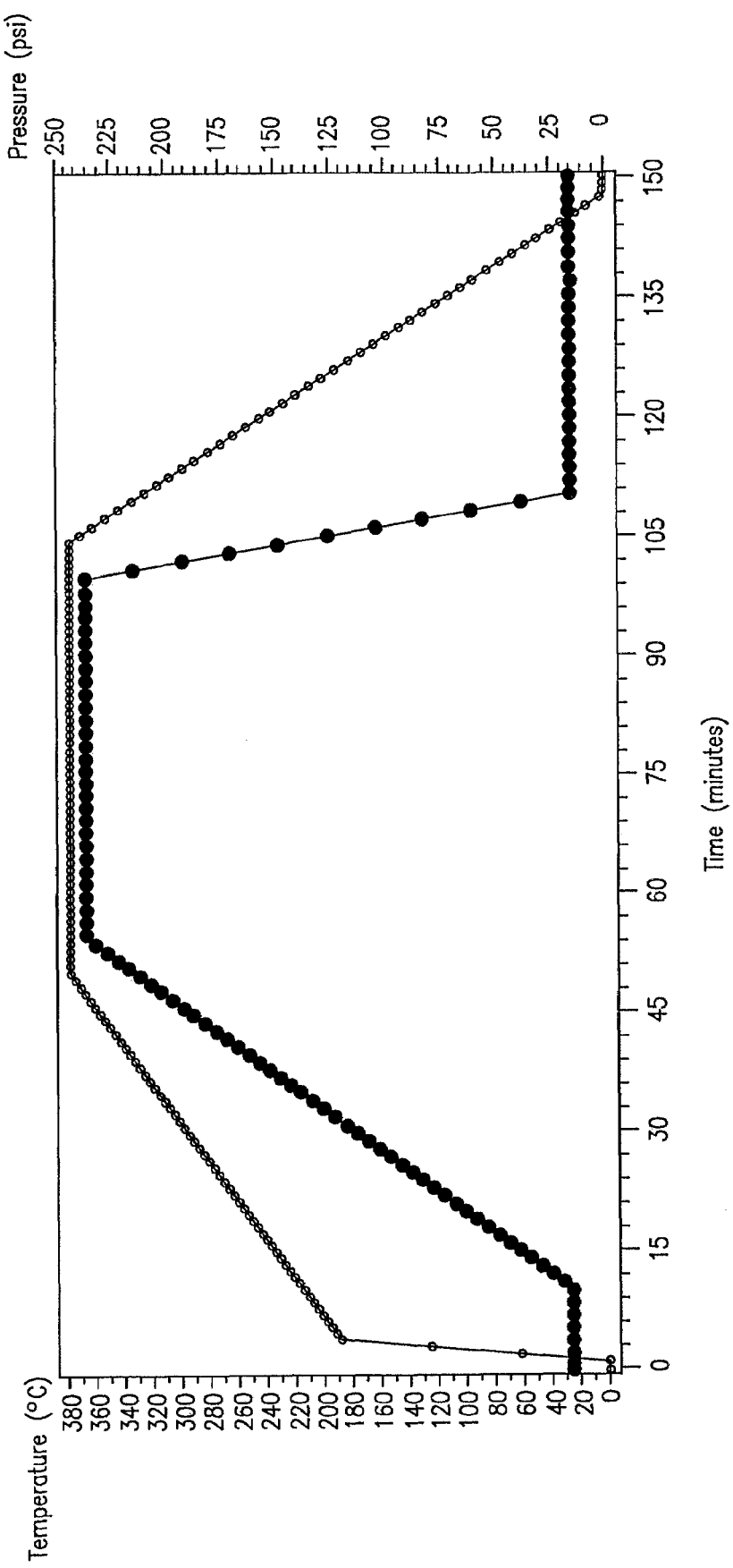
FIG. 1 is a chart of the temperature and pressure conditions for densification of the membranes of Example 1.

The objectives of this invention are accomplished by a process involving, in an initial step, expanding a polytetrafluoroethylene (PTFE) sheet or sheets and compressing said sheet or sheets in a direction normal to the x-y plane in order to achieve a bulk PTFE density of 2.11 g/cc or greater, such as is described in U.S. Pat. No. 5,374,473 to Knox et al. ("Knox '473"). After compression, in a further processing step, the compressed sheet(s) are heated to a temperature above the crystalline melt temperature of PTFE and subsequently stretched. The resultant sheet has greater tensile strength in the direction of stretch than the compressed precursor from which it was made, has improved barrier properties as demonstrated by increased water vapor permeation resistance, and has reduced thickness, increased width and/or increased length as dictated by the stretching operation performed. This aspect of the invention is novel in that no one has heretofore made a PTFE material with this unique combination of properties.

The sheets, or films, of expanded PTFE were made in accordance with the teachings of U.S. Pat. No. 3,953,566. In one embodiment of the invention, an aliquot of the polytetrafluoroethylene fine powder (PTFE 601A, DuPont, Wilmington, Del.) was obtained and subsequently combined with a lubricant (Isopar K aliphatic hydrocarbon, Exxon, Houston, Tex.). After blending, the lubricated powder was compressed into a cylindrical pellet and heat treated for a period of 18 hours. The pellet was then extruded through a rectangular die at a reduction ratio of 70:1. The direction of paste extrusion is referred to as the y, or machine, direction. The resulting tape was then dried. The dried PTFE tape was then expanded in the y-direction between heated drums at a linear rate of greater than 10%/second, a drum temperature of about 225° C. and a stretch amount equal to about 400%. The tape was then expanded in the x-direction at a linear rate greater than 10%/second, a temperature of about 295° C. and a stretch amount equal to about 700%. It is understood that this expansion may be conducted in either direction or both directions, either sequentially or simultaneously, utilizing a pantograph machine or continuously on a tenter frame or similar machine. Suitable expansion ratios may vary significantly, such as from 1:1 to 100:1, or greater and at varying expansion rates. Representative, but in no way limiting, expansion rates and ratios are included in the examples that follow. The films are next compressed in accordance with the teachings of Knox '473.

The densified films were then stretched at temperatures exceeding the crystalline melt temperature of PTFE. Stretch ratios as high as 12:1 were achieved at stretch rates including, but not limited to, 5% per second. It is understood that this stretching process may be conducted in either direction, both directions either sequentially or simultaneously utilizing a pantograph machine or continuously on a tenter frame or similar machine. More specifics are noted in individual examples.

It is believed that stretch ratios as high as 12:1, or greater, in both the x and y directions are achievable, and one skilled in the art realizes that the limitations associated with stretch amount are a function of the original compressed precursor. More specifically, stretch ratio is believed to be limited by the original mechanical properties and thickness of the compressed precursor. The thickness of the compressed precursor directly impacts the ability to achieve high stretch amounts as when the compressed precursor is stretched at a temperature above the crystalline melt temperature of the ePTFE, the bulk density of the compressed precursor is increased. The stretching results in a reduction in unit weight and thickness. A significant increase in the matrix tensile strength of the sheet or sheets is also observed. As the following examples illustrate, matrix tensile strengths of greater than 80,000 psi were achieved with an increase in the bulk density of the PTFE sheet or sheets, as demonstrated by the reduction in water vapor permeation. It is also believed that greater matrix tensile strengths can be achieved through greater amounts of stretch.

This invention is novel in that for the first time an extremely thin, high PTFE bulk density film with extraordinarily low water vapor permeation coefficients and high tensile strengths in both the x and y directions can be produced. For example, preferred thicknesses of less than 250 μm, more preferably less than 150 μm, even less than 50 μm, and most preferably even less than 10 μm, can be obtained. It is not intuitively obvious that one can stretch a dense PTFE material and produce a finished article with lower water vapor permeation, increased strength and without reduction in bulk density.

The novel processing technology detailed above has enabled the fabrication of a new, unique and novel PTFE sheet. As will be further described in the following examples, this new material is a PTFE with a water vapor permeation coefficient of about 0.015 g-mm/m$^2$/day or less, more preferably about 0.010 g-mm/m$^2$/day or less, and even more preferably as low as about 0.003 g-mm/m$^2$/day or less. In addition, these materials preferably have a matrix tensile strength in both the x and y directions of at least 10,000 psi, more preferably at least 15,000 psi in at least one direction, and most preferably at least 25,000 psi in at least one direction. This material may be produced in an array of lengths and widths, and thicknesses as low as 3.5×10$^{-5}$ inches (0.9 μm) or less have been achieved. In addition, the novel PTFE sheet may be filled with one or more fillers or incorporated in a composite sheet or sheets.

From a processing perspective this technology is unique and affords a means of overcoming prior limitations to producing low permeability films. In summary, the value of this processing technology is the ability to significantly lower the water vapor permeation of the sheet or sheets, significantly increase its matrix tensile strength and reduce thickness.

The following examples are not intended to limit the scope of this process or the materials that result therefrom.

Test Methods and Process Metrics

Water Vapor Permeability Testing and Water Vapor Permeation Coefficient Determination Determination of the water vapor permeability of the materials was carried out in accordance with ASTM F-1249 by MOCON, Inc. (Minneapolis, Minn.).

Specifically, the instrument used to test the water vapor permeation of the materials was a MOCON Permatran W 3/31 (MOCON/Modern Controls, Inc., Minneapolis, Minn.). The permeant used was 100% RH water vapor (49.157 mmHg), the carrier gas was 100% nitrogen, dry, at ambient pressure and the temperature at which the test was carried out was 37.8° C.

Test samples were cut to approximately 10 cm by 10 cm, affixed in the instrument diffusion cell and conditioned according to the instructions for the MOCON Permatran W 3/31. Water vapor transmission rate, or water vapor permeability, was reported by the instrument in g/m$^2$/day.

The water vapor permeation coefficient of each sample was calculated by multiplying the water vapor transmission rate by the thickness of the test sample. Results are reported as g-mm/m$^2$/day.

Matrix Tensile Strength Testing

All specimens were tested according to ASTM D 882-90. A 20 in./min. (508 mm/min.) cross-head speed, 2 inch (51 mm) gauge length and rectangular specimen of at least 5 inches (127 mm) in length were employed.

The quantity matrix tensile is a means of expressing the maximum load developed during the test as a function of the cross-sectional area of material in the specimen. This provides a means of accurately comparing tensile strengths among PTFE-based specimen of varying density or porosity by normalizing the stress at maximum load with respect to the cross-sectional area of the PTFE within the sample.

Specifically:

Matrix Tensile (psi)=Max load (lb.)/X-sect area PTFE (in.$^2$)

where, Max load=Maximum load specimen generates during testing x-sect area PTFE (in.$^2$)=gperft/(12×P×2.54$^3$)=gperft×2.3×10$^{-3}$ where gperft=specimen unit weight in grams per 1 foot P=Mean intrinsic density of PTFE=2.18 g/cc Therefore Matrix Tensile (psi) =Max Load (lb.)/(gperft×2.3×10$^{-3}$)

Similarly, Matrix Tensile (Mpa)=Matrix Tensile (psi)×6.89*10$^{-3}$

Differential Scanning Calorimetry (DSC)

This test is performed using a TA Instruments Q1000 DSC and TA Instruments standard aluminum pans and lids for DSC. A TA Instruments Sample Encapsulation Press was used to crimp the lid to the pan. Weight measurements were performed on a Sartorius MC 210P microbalance.

One pan and lid were weighed on the balance to 0.01 mg precision. Using a 6.0 mm die punch, enough discs of the test sample material were added to the pan to constitute 6 mg, again recorded to 0.01 mg precision. These values were entered into the Thermal Advantage control software for the Q1000. The lid was placed on the pan and was crimped using the press. Care was taken to ensure that no sample material was caught in the crimp between the lid and the pan. A similar pan for reference was prepared, with the exception of the sample article, and its weight was also entered into the software. The pan containing the sample article was loaded onto the sample sensor in the Q1000 and the empty pan was loaded onto the reference sensor. The samples were then subjected to the following thermal cycling steps:

1) Equilibrate at −50.00° C.
2) Ramp 20.00° C./min to 360.00° C.
3) Isothermal for 5.00 min
4) Mark end of cycle
5) Ramp 20.00° C./min to −50.00° C.
6) Mark end of cycle
7) Ramp 20.00° C./min to 420.00° C.
8) Mark end of cycle
9) End of method Data was analyzed, unaltered, using Universal Analysis 2000 v.3.9A from TA Instruments. Data from the scan indicated in step 7 were analyzed.

EXAMPLES

Example 1

A 240 lb. aliquot of PTFE fine powder (PTFE 601A, DuPont, Wilmington, Del.) was combined with 44.16 lb. of lubricant (Isopar K, Exxon, Houston, Tex.), subsequently blended, compressed into a cylindrical pellet, and thermally conditioned for 18 hours at a temperature of 49° C. The cylindrical pellet was then extruded through a rectangular die at a reduction ratio of 70:1. The resultant tape was then dried in order to remove the lubricant.

The dried PTFE tape was then expanded in the y-direction between heated drums at a linear rate of greater than 10%/s, a drum temperature of 225° C. and stretch amount equal to 400%. The tape was then expanded in the x-direction at a linear rate greater than 10%/s, a temperature of about 295° C. and stretch amount equal to 700%. The resulting product was an unsintered ePTFE membrane.

In order to determine the effect of sintering on the water vapor permeability of membranes, a portion of this unsintered ePTFE membrane was restrained and subsequently sintered so that two membranes, one sintered and one unsintered, could be subjected to further processing. By "sintering" is meant subjecting the material to a temperature above the crystalline melt temperature of PTFE. Sintering of the one membrane was accomplished by exposing the membrane to a temperature of 375° C. for 220 seconds by passing it through an oven. No additional expansion was imparted during the sintering operation.

The two resulting membrane precursors, one sintered and one unsintered, were densified according to U.S. Pat. No. 5,374,473 Knox, et al. Specifically, four plies of the unsintered membrane with a nominal thickness of 0.013 inch (330 μm) and five plies of the sintered membrane with a nominal thickness of 0.008 inch (203 μm) were placed between two caul plates in an autoclave bag assembled from polyimide film (DuPont's KAPTON®). The assembly was placed in an autoclave (Vacuum Press International Series 24), vacuum was drawn in the bag and the pressure and temperature of the autoclave were gradually raised based upon the temperature and pressure conditions summarized in FIG. 1. The resultant compressed ePTFE sheets, one sintered and one unsintered, were approximately 0.010 inch thick. Samples of each of the sintered and unsintered forms of this intermediate PTFE were tested for water vapor permeation and were found to be 0.1 and 0.127 g-mm/m$^2$/day, respectively.

The resultant compressed articles were then placed in a pantograph machine wherein the material was heated above the crystalline melt temperature of PTFE by exposure to air temperature of about 370° C. for a period of 20 minutes. The samples, while still heated, were then stretched in the x-direction or simultaneously in both the x and y-directions at stretch amounts of up to 1100% and a stretch rate of 5% per second for each direction. Processing conditions are summarized in Table 1. As shown in Table 1, for each of the sintered and unsintered membranes, two melt stretch conditions were performed. Four test specimens were analyzed from each combination of sintering condition and melt stretch processing. Note that a two-pass process wherein the result of the first melt stretch operation was used as the precursor of the second stretch was used to produce these embodiments.

The samples were then subjected to Water Vapor Permeability testing using the procedure described above herein. Table 2 summarizes the water vapor permeation coefficients, matrix tensile strengths, thicknesses and percent crystallinity for the various samples.

Figure 2:
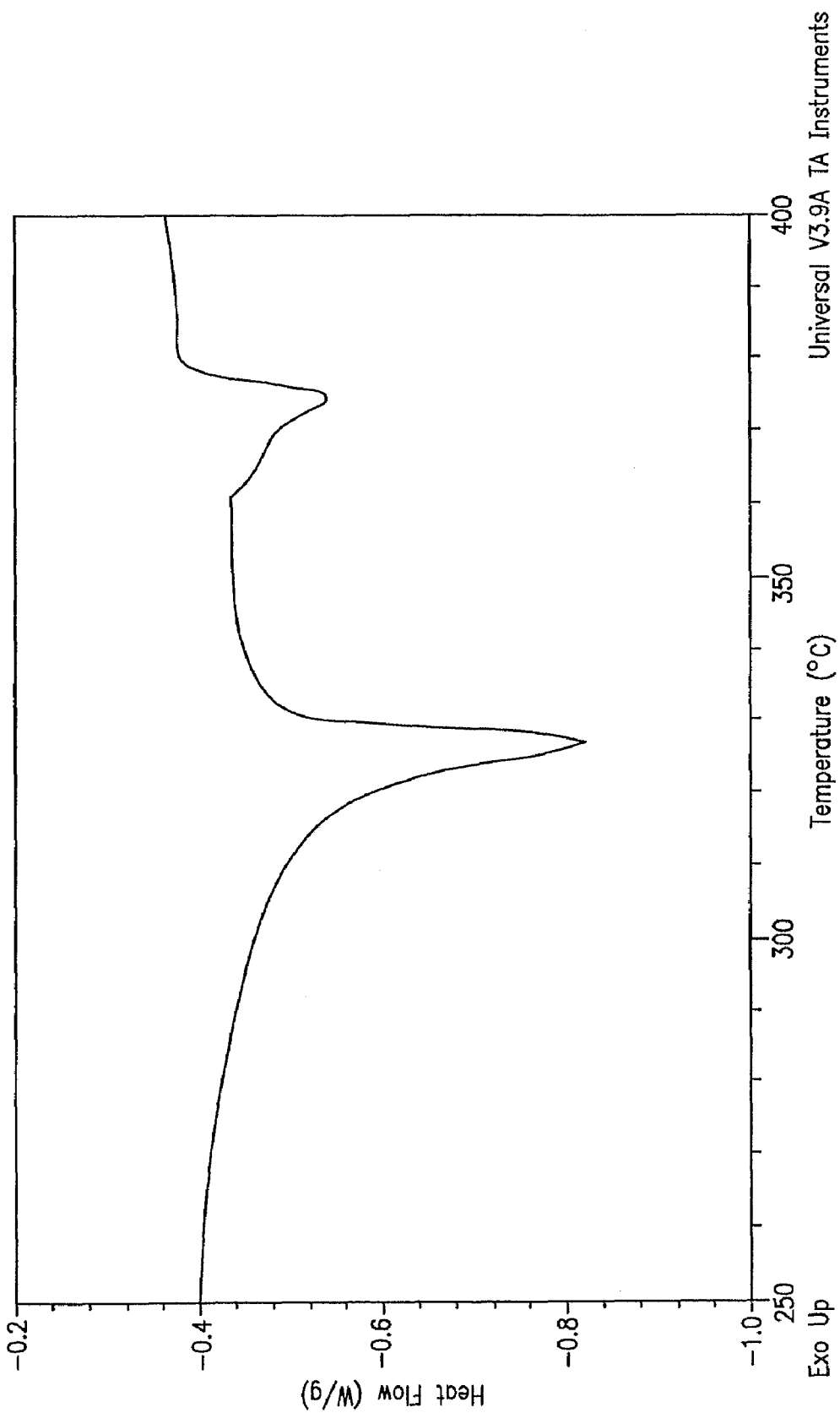
FIG. 2 is a differential scanning calorimetry (DSC) scan of a sample made in Example 1.

A sample processed according to processing condition "D" identified in Table 2 was evaluated thermally using Differential Scanning Calorimetry, and the resulting scan for this sample is shown in FIG. 2.

TABLE 1

Process Conditions for Samples of Example 1

| Example ID Number | Transverse Direction Melt Stretch (TDMS) Ratio | Machine Direction Melt Stretch (MDMS) Ratio | PTFE Precursor | $1^{st}$ Pass TDMS Ratio | $1^{st}$ Pass MDMS Ratio | $2^{nd}$ Pass TDMS Ratio | $2^{nd}$ Pass MDMS Ratio |
|---|---|---|---|---|---|---|---|
| A-1 | 9 | 3 | Non-Sintered | 3 | 3 | 3 | 1 |
| A-2 | 9 | 3 | Non-Sintered | 3 | 3 | 3 | 1 |
| A-3 | 9 | 3 | Non-Sintered | 3 | 3 | 3 | 1 |
| A-4 | 9 | 3 | Non-Sintered | 3 | 3 | 3 | 1 |
| B-1 | 12 | 3 | Non-Sintered | 3 | 3 | 4 | 1 |
| B-2 | 12 | 3 | Non-Sintered | 3 | 3 | 4 | 1 |
| B-3 | 12 | 3 | Non-Sintered | 3 | 3 | 4 | 1 |
| B-4 | 12 | 3 | Non-Sintered | 3 | 3 | 4 | 1 |
| C-1 | 9 | 3 | Sintered | 3 | 3 | 3 | 1 |
| C-2 | 9 | 3 | Sintered | 3 | 3 | 3 | 1 |
| C-3 | 9 | 3 | Sintered | 3 | 3 | 3 | 1 |
| C-4 | 9 | 3 | Sintered | 3 | 3 | 3 | 1 |
| D-1 | 12 | 3 | Sintered | 3 | 3 | 4 | 1 |
| D-2 | 12 | 3 | Sintered | 3 | 3 | 4 | 1 |
| D-3 | 12 | 3 | Sintered | 3 | 3 | 4 | 1 |
| D-4 | 12 | 3 | Sintered | 3 | 3 | 4 | 1 |

TABLE 2

Properties of Samples of Example 1

| Example ID - | Water Permeation Coefficient (g*mm/m^2/day) | Tensile Strength - Length Direction | Tensile Strength - Width Direction | Thickness |
|---|---|---|---|---|
| A-1 | .0042 | 30420 psi | 71360 psi | 9.0 μm |
| A-2 | .0056 | 32500 | 67600 | 9.0 |
| A-3 | .0042 | 31800 | 64920 | 9.0 |
| A-4 | .0040 | 30190 | 68940 | 9.0 |
| B-1 | .0037 | 26890 | 88880 | 8.5 |
| B-2 | .0024 | 24760 | 91910 | 8.5 |
| B-3 | .0021 | 24870 | 91660 | 8.5 |
| B-4 | .0024 | 28780 | 86910 | 8.5 |
| C-1 | .0054 | 29000 | 63670 | 14.0 |
| C-2 | .0091 | 30440 | 63800 | 14.0 |
| C-3 | .0103 | 29340 | 65340 | 14.0 |
| C-4 | .0054 | 28970 | 62540 | 14.0 |
| D-1 | .0043 | 24640 | 78060 | 13.0 |
| D-2 | .0043 | 25790 | 76910 | 13.0 |
| D-3 | .0039 | 23610 | 80460 | 13.0 |
| D-4 | .0036 | 26500 | 75310 | 13.0 |

Example 2

A laminate of dense PTFE and perfluoroacrylate (PFA) was made in the following manner. Specifically, a PTFE material was made according to the processing conditions noted for the "A" samples described in Example 1, using a two-pass stretching operation. Following the second pass stretching, the heater was removed from the pantograph. While the stretched PTFE barrier film remained on the pantograph pin body, a PFA film (Part No. 100 LP, 0.001 inch (25 μm) thick, from DuPont, Wilmington, Del.) was placed on one side of the PTFE barrier film. The two films were then subjected to a temperature of 370° C. for 5 minutes to form a laminate of PTFE barrier film and PFA.

Example 3

An unsintered expanded PTFE material was made and densified according to U.S. Pat. No. 5,374,473 Knox, et al. as described in Example 1, except that only a single ply of the unsintered material was subjected to the densification step. The resulting densified material was then stretched according to the processing conditions "A" described in Example 1. The resulting PTFE barrier film had a thickness of 0.1 mils (2.5 μm) and a water vapor permeation coefficient of 0.007 g-mm/m$^2$/day.

Example 4

An unsintered expanded PTFE material was made and densified according to U.S. Pat. No. 5,374,473 Knox, et al. as described in Example 1, except that only two plies of the unsintered material were subjected to the densification step. The resulting densified material was then stretched according to the processing conditions "B" described in Example 1. The resulting PTFE barrier film had a thickness of 0.1 mils (2.5 μm) and a water vapor permeation coefficient of 0.003 g-mm/m$^2$/day.

Comparative Example

In an attempt to roughly assess the relative water vapor permeation coefficient of the material of the present invention versus commercially available fluoropolymer materials, a series of commercially available fluoropolymer films was evaluated. Four samples of each of the following films were sent to MOCON, Inc. for determination of water vapor permeation coefficient, and the results are shown graphically in FIG. 3:

| Material | Source |
| --- | --- |
| ACLAR ULTREX ® 2000 film | Honeywell Corporation |
| ACLAR ULTREX ® 3000 film | Honeywell Corporation |
| DEWAL 200T ® film (2 mil) | DeWAL Industries |
| DEWAL 220T ® film (2 mil) | DeWAL Industries |
| DEWAL 502T ® film (2 mil) | DeWAL Industries |
| FEP (2 mil) | DuPont |
| PFA (2 mil) | DuPont |

Figure 3:
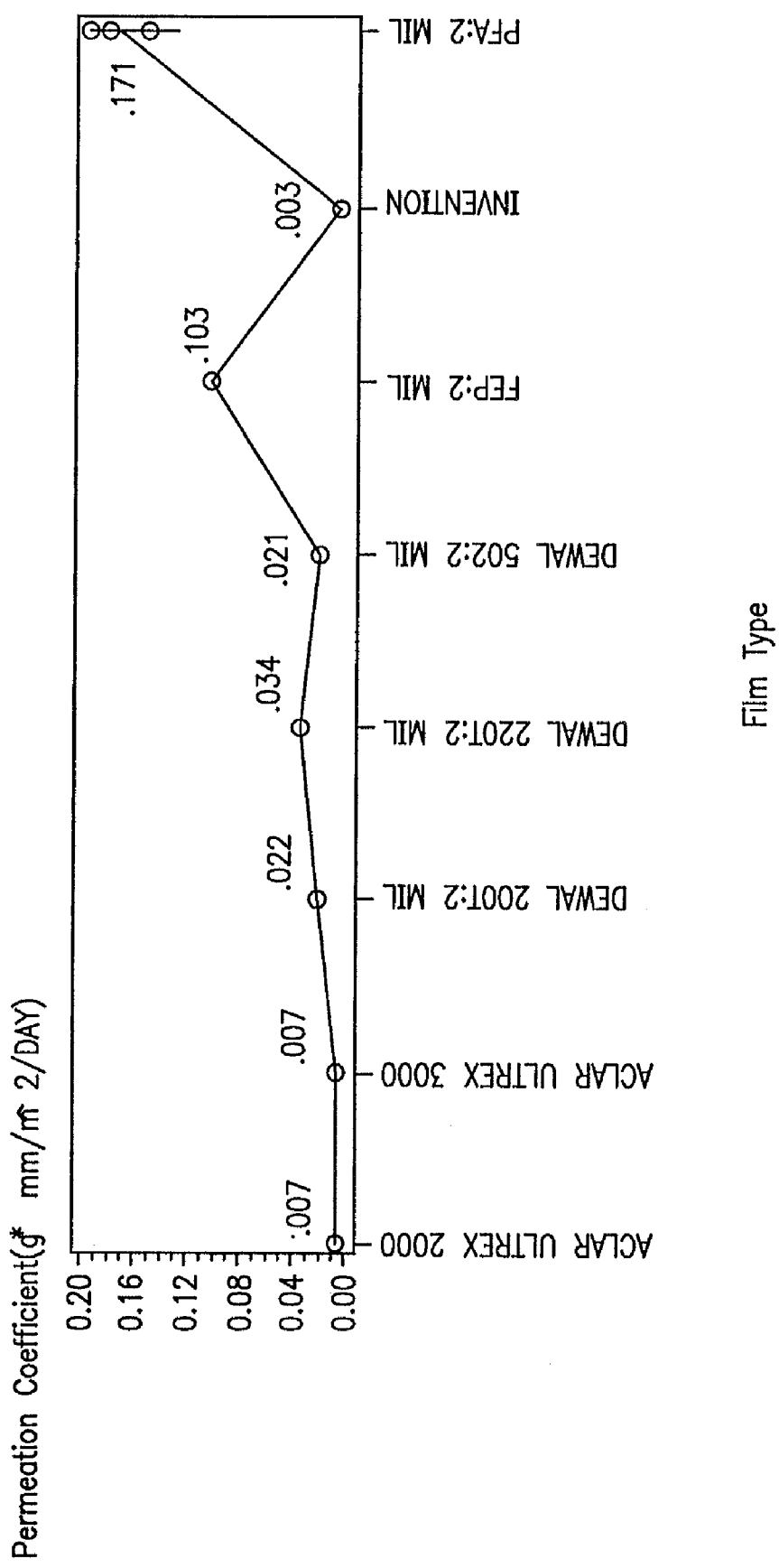
FIG. 3 is a graph showing water vapor permeation coefficients for a material of the invention and for a range of commercially available materials.

Comparison was made in FIG. 3 with sample D-4 of Example 1.

We claim:

1. A method of making a polytetrafluoroethylene (PTFE) film having a water vapor permeability coefficient of about 0.015 g-mm/m$^2$/day or less, the method comprising the steps:
    (a) preparing of a biaxially expanded PTFE film;
    (b) densifying said expanded PTFE film;
    (c) stretching the densified expanded PTFE film at a temperature exceeding the crystalline melt temperature of PTFE.

2. The method of claim 1, wherein the expanded PTFE film is sintered prior to step (b).

3. The method of claim 1, wherein said biaxially expanded PTFE film comprises two or more plies of expanded PTFE.

4. The method of claim 1, wherein said steps are carried out in a continuous manner.

* * * * *